(12) United States Patent
Haas et al.

(10) Patent No.: US 7,361,108 B2
(45) Date of Patent: Apr. 22, 2008

(54) CONTINUOUSLY VARIABLE TRANSMISSION

(75) Inventors: Wolfgang Haas, Bühl (DE); Oswald Friedmann, Lichtenau (DE)

(73) Assignee: LuK Lamellen und Kupplungsbau Beteiligungs KG, Bühl (DE)

( * ) Notice: Subject to any disclaimer, the term of this patent is extended or adjusted under 35 U.S.C. 154(b) by 700 days.

(21) Appl. No.: 10/800,155

(22) Filed: Mar. 13, 2004

(65) Prior Publication Data

US 2004/0248680 A1    Dec. 9, 2004

(30) Foreign Application Priority Data

Mar. 13, 2003   (DE) ................... 103 10 833

(51) Int. Cl.
*F16H 9/18* (2006.01)
*F16H 55/56* (2006.01)

(52) U.S. Cl. ................ 474/35; 474/34; 474/20; 474/8

(58) Field of Classification Search ........... 474/8, 474/19, 18, 28, 30–35, 39–46, 24, 20, 17
See application file for complete search history.

(56) References Cited

U.S. PATENT DOCUMENTS

| | | | | |
|---|---|---|---|---|
| 2,805,583 A * | 9/1957 | Besel | .......... | 474/31 |
| 3,365,967 A * | 1/1968 | Moogk | .......... | 474/19 |
| 3,380,315 A * | 4/1968 | Emerson | .......... | 474/30 |
| 3,628,389 A * | 12/1971 | Wiegelmann et al. | .......... | 474/19 |
| 3,656,359 A * | 4/1972 | Dorf et al. | .......... | 474/167 |
| 3,715,928 A * | 2/1973 | Case et al. | .......... | 474/34 |
| 3,747,721 A * | 7/1973 | Hoff | .......... | 180/230 |
| 3,811,331 A * | 5/1974 | Moogk | .......... | 474/19 |
| 3,857,295 A * | 12/1974 | Hall et al. | .......... | 474/265 |
| 4,473,367 A * | 9/1984 | Wiegelmann | .......... | 474/19 |
| 4,674,994 A * | 6/1987 | Tomiyori et al. | .......... | 474/24 |
| 4,875,893 A * | 10/1989 | Giacosa | .......... | 474/28 |
| 5,127,882 A * | 7/1992 | Mantovaara | .......... | 474/8 |

FOREIGN PATENT DOCUMENTS

DE          (3015495  A1 * 11/1981

* cited by examiner

*Primary Examiner*—Marcus Charles
(74) *Attorney, Agent, or Firm*—Alfred J. Mangels

(57) ABSTRACT

A continuously variable transmission with two conical disk pairs on the input side and two conical disk pairs on the output-side that are connected with each another by two parallel endless torque-transmitting members in a drive mechanism. In one form of the transmission an asymmetrical cone angle on the conical disks enables the installation space to be reduced.

13 Claims, 5 Drawing Sheets

CONTINUOUSLY VARIABLE TRANSMISSION

BACKGROUND OF THE INVENTION

1. Field of the Invention

The present invention relates to a steplessly adjustable, belt-driven conical-pulley transmission having two pairs of input-side conical disks and two pairs of output-side conical disks that are drivingly connected together by two endless torque-transmitting means connected in parallel.

2. Description of the Related Art

Conventional steplessly adjustable, belt-driven conical-pulley transmissions often have a complicated adjustment mechanism that additionally requires a relatively large space. Depending upon the size of the available drive assembly, problems can arise with the available installation space.

It is therefore an object of the present invention to provide a steplessly adjustable, belt-driven conical-pulley transmission having two pairs of input-side conical disks and two pairs of output-side conical disks that are drivingly connected together by two endless torque-transmitting means connected in parallel, and that is quickly and reliably adjustable and is optimized with respect to the required installation space.

The object is achieved by providing an asymmetrical conical-angle arrangement in a steplessly adjustable, belt-driven conical-pulley transmission having two pairs of input-side conical disks and two pairs of output-side conical disks that are drivingly connected together by two endless torque-transmitting means connected in parallel. The asymmetrical conical-angle arrangement has proven to be extremely advantageous in reference to the adjustment of the distance between the conical disks.

A preferred embodiment of a belt-driven conical-pulley transmission is characterized in that the two pairs of input-side conical disks and the two pairs of output-side conical disks in each case include two outer, axially-fixed conical disks. Preferably, the inner conical disks are designed to be axially displaceable. That arrangement leads to an advantageous uniform contact pressure on both of the endless torque-transmitting means, and thereby to an equal load division.

An additional preferred embodiment of the belt-driven conical-pulley transmission is characterized in that the outer, axially-fixed conical disks have a small cone angle, particularly a maximum of about 1°. The skew of the endless torque-transmitting means can be kept as small as possible due to the small angle of the axially-fixed conical disks. Ideally the angle would be 0°.

Another preferred embodiment of the belt-driven conical-pulley transmission is characterized in that between the outer, axially-fixed conical disks two axially-displaceable conical disks are arranged that have a relatively large cone angle, particularly between 10° and 30°, preferably between about 15° and 20°, and especially about 17°. The relatively large cone angle of the axially-displaceable conical disks results in a relatively long guide pathway along the inner surface of the conical disks. The distribution of the overall cone angle in the above-described way between the axially-fixed and the axially-displaceable conical disks leads to a shorter, more compact structure.

A further preferred embodiment of the belt-driven conical-pulley transmission is characterized in that two actuators, particularly two piston/cylinder units, are provided between the axially-displaceable conical disks. The two actuators, which can be in the form of hydraulic cylinders, for example, serve to provide the necessary contact forces as well as the adjustment forces. The double piston principle has proven particularly advantageous in combination with the centrally-located, axially-displaceable conical disks. The central location of the contact pressure cylinders leads to an equal contact pressure on the two endless torque-transmitting means and therefore to an equal load division.

A further preferred embodiment of the belt-driven conical-pulley transmission is characterized in that the two axially-displaceable conical disks are guided relative to each other in the axial direction. By reason of the guide arrangement a tilting of the two conical disks relative to each other is prevented.

Another preferred embodiment of the belt-driven conical-pulley transmission is characterized in that the two axially-displaceable conical disks are non-rotatably connected together by a form-locking connection, particularly by a gear-tooth arrangement. In that way, it is ensured that the torque will be securely transmitted from the input shaft to the output shaft.

An additional preferred embodiment of the belt-driven conical-pulley transmission is characterized in that between the axially-displaceable conical disks several centrifugal weights and a transmission disk are arranged. The disk includes spiral grooves for converting radially outward movements of the centrifugal weights into a rotational movement of the transmission disk. A screw thread on the inner diameter of the transmission disk serves to convert the rotational movement of the transmission disk into an axial movement of the axially-displaceable conical disks relative to each other. Thereby, a reliable, mechanical compensation for the centrifugally-generated oil pressure is produced. The centrifugal weights are equally circumferentially distributed relative to the associated conical disks. Preferably, the centrifugal weights are provided with pins that axially engage the grooves of the transmission disk. The centrifugal weights are preferably supported on the opposite side by straight, radial grooves in the associated coupling disc. Preferably a coarse screw thread is provided on the inner diameter of the transmission disk. The mechanical compensation arrangement for centrifugally-generated oil pressure causes the two axially-displaceable coupling disks to be pulled together against the centrifugally-generated oil pressure, and that mechanical arrangement thereby compensates for it. The mechanical compensation arrangement for centrifugally-generated oil pressure can also be used advantageously in connection with a symmetrical cone angle design.

The object indicated above is achieved in a continuously variable belt-driven conical-pulley transmission having two pairs of input-side and two pairs of output-side conical disks that are drivingly connected together by two parallel, endless torque-transmitting means and that have symmetrical cone angles, in that the two pairs of input-side and the two pairs of output-side conical disks each have only one axially-fixed conical disk. That results in the advantage that the negative effects of an asymmetrical cone angle arrangement can be circumvented.

A preferred embodiment of the belt-driven conical-pulley transmission is characterized in that both middle conical disks of the input-side conical disk pair are connected together as one piece. The contact pressure advantageously then takes place from the side where the axially-displaceable conical disk is located.

An additional preferred embodiment of the belt-driven conical-pulley transmission is characterized in that two of the three axially-displaceable output-side conical disks are coupled together in the axial direction. The coupling can be achieved, for example, by inner threaded rods.

Another preferred embodiment of the belt-driven conical-pulley transmission is characterized in that the two axially-displaceable output-side conical disks are coupled together by threaded bushings. A secure support of the axially-displaceable conical disks against each other can be assured by the threaded bushings.

A further preferred embodiment of the belt-driven conical-pulley transmission is characterized in that the space between the two axially-displaceable output-side conical disks is radially outwardly sealed by a telescoping cylinder. That contributes to keeping small the dimensions of the belt-driven conical-pulley transmission in accordance with the invention.

The above-mentioned object is also achieved in a steplessly adjustable, belt-driven conical-pulley transmission having two pairs of input-side and two pairs of output-side conical disks that are drivingly connected together by two endless torque-transmitting means connected in parallel, in which between two conical disks that operate together with different endless torque-transmitting means, on one of the conical disks several threaded spindles distributed in a star pattern in the radial direction are rotatably supported, on each of which a centrifugal weight is movably guided and which is coupled with a toothed rack in such a way that rotational movement of the threaded spindles, which is caused by a movement of the corresponding centrifugal weight in a radial direction, is transformed into an axial displacement of the corresponding toothed rack that is coupled with the other conical disk. Thereby, a reliable device is provided to compensate for the centrifugally generated oil pressure.

The above-mentioned object is also achieved in a steplessly adjustable, belt-driven conical-pulley transmission having two pairs of input-side and two pairs of output-side conical disks that are drivingly connected together by two endless torque-transmitting means connected in parallel, two conical disks that operate together with different endless torque-transmitting means are coupled with one another by a toggle link device on which at least one centrifugal weight is installed and in such a way that the two conical disks move toward each other when the centrifugal weight moves radially outward. Thereby a further reliable device is provided to compensate for the centrifugally-generated oil pressure.

The above-mentioned object is achieved in a drive unit, especially for motor vehicles, by the inclusion of the above-described transmission.

BRIEF DESCRIPTION OF THE DRAWINGS

Further advantages, characteristics, and details of the invention will be evident from the following description in which different embodiments are described in detail in reference to the drawings. The characteristics mentioned in the claims and in the description can be essential for the invention individually as well as in any combination. There is shown:

DESCRIPTION OF THE PREFERRED EMBODIMENTS

Figure 1:
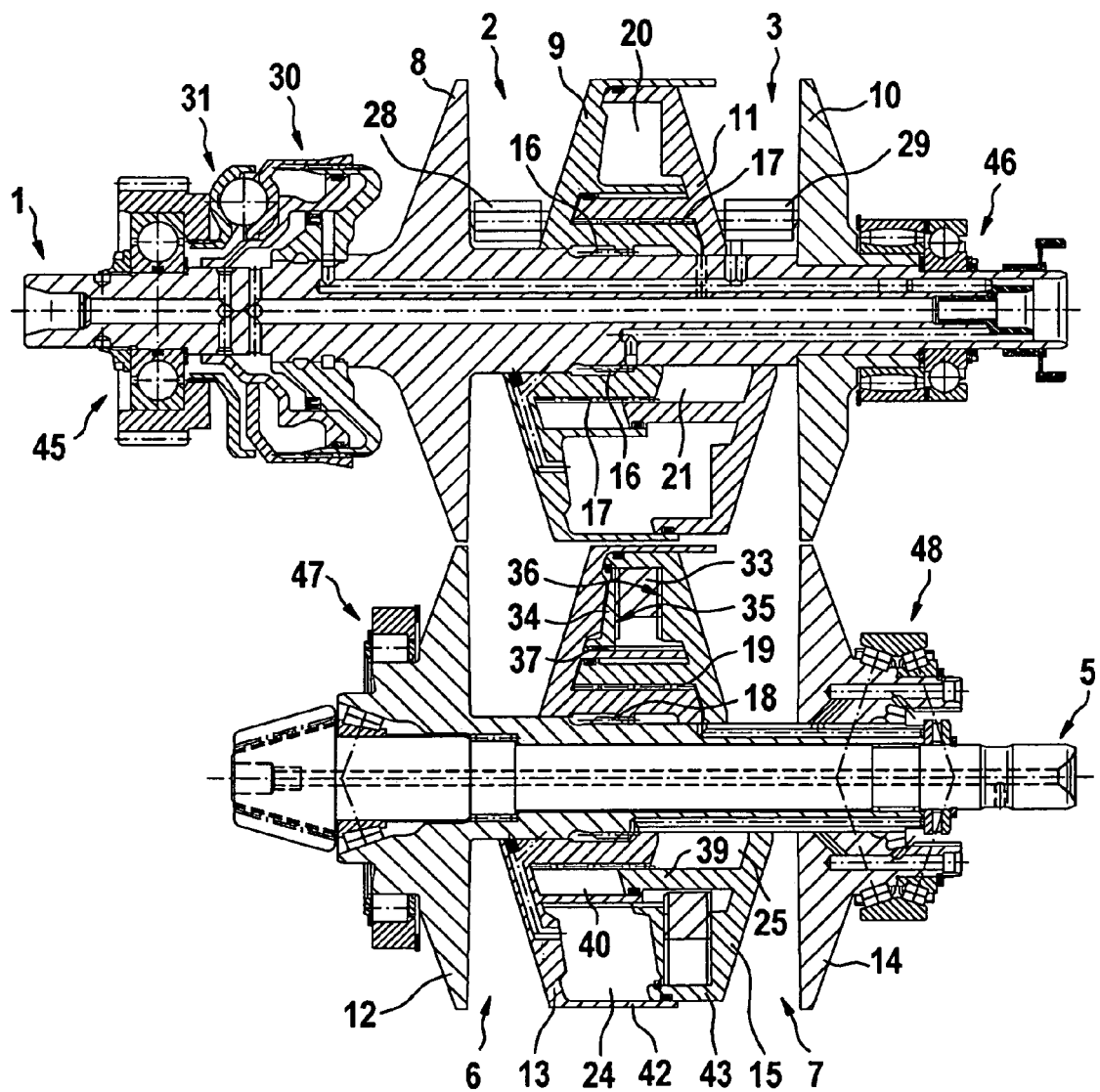
FIG. 1 is a schematic cross-sectional view of a belt-driven conical-pulley transmission with an asymmetrical cone angle arrangement.

The embodiment of the belt-driven conical-pulley transmission shown in FIG. 1 includes two input-side conical disk pairs 2, 3 that are non-rotatably installed on an input shaft 1, and two output-side conical disk pairs 6, 7 that are non-rotatably installed on an output shaft 5. The input-side conical disk pairs 2, 3 and the output-side conical disk pairs 6, 7 are each connected in parallel.

An endless torque-transmitting means, such as a pulling or a pushing means, is provided between the input-side conical disk pair 2 and the output-side conical disk pair 6. For example, a chain could be used for the pulling means. A separate, parallel endless torque-transmitting means is provided between the input-side conical disk pair 3 and the output-side conical disk pair 7.

The input-side conical disk pair 2 includes an outer, axially-fixed conical disk 8 and an inner, axially-displaceable conical disk 9. The input-side conical disk pair 3 includes an outer, axially-fixed conical disk 10 and an inner, axially-displaceable conical disk 11. The output-side conical disk pair 6 includes an outer, axially-fixed conical disk 12 and an inner, axially-displaceable conical disk 13. The output-side conical disk pair 7 includes an outer, axially-fixed conical disk 14 and an inner, axially-displaceable conical disk 15.

The axially-fixed conical disks 8, 10; 12, 14 have a small cone angle of a maximum of 1°. Because of the small cone angle, the skew of the endless torque-transmitting means can be kept as small as possible.

The two axially-displaceable conical disks 9, 11; 13, 15 are each located centrally between the corresponding axially-fixed conical disks and have a relatively large cone angle of about 17°

The conical disk 9 is non-rotatably but axially-displaceably connected with the input shaft 1 by means of axially-extending teeth 16. The conical disk 11 is non-rotatably but axially-displaceably connected with the conical disk 16 by means of axially-extending teeth 17. The conical disk 13 is non-rotatably but axially-displaceably connected with the output shaft 5 by means of axially-extending teeth 18. The conical disk 15 is non-rotatably but axially-displaceably connected with the conical disk 13 by means of axially-extending teeth 19.

The appropriate axial shift of the axially-displaceable conical disks 9, 11; 13, relative to the respective axially-fixed conical disks 8, 10; 12, 14 leads to a change in the running radius of the endless torque-transmitting means in relation to the parallel-connected conical disk pairs, so that a change of the transmission ratio condition can thereby be implemented. The transmission ratio of the transmission can be accurately steplessly controlled from a highest transmission ratio at slow speed (underdrive) to a lowest transmission ratio at high speed (overdrive).

The spacings between the conical disks 8, 9 and 10, 11 can be adjusted by an actuator that includes two piston/cylinder units 20, 21. Correspondingly, the spacing between the conical disks 12, 13 and 14, 15 can be adjusted by an actuator that includes the two piston/cylinder units 24, 25. When applying pressure to the actuators 20, 21; 24, 25, which can also be designated as pressure chambers, the endless torque-transmitting means, which are designated as 28 and 29 on the input side, are axially tensioned.

The chambers of the piston/cylinder units 20, 21; 24, 25 can be alternately filled with or emptied of a pressure medium in accordance with the required transmission ratio, meaning they can be pressurized or depressurized. The pressure chamber 20, 24 serves to assure the basic contact pressure of the axial conical disks against the corresponding endless torque-transmitting means. The pressure chamber 21, 25 serves to adjust the transmission ratio by the application or release of pressure.

The supply of pressure to the pressure chambers 20, 21; 24, 25 for producing the basic contact pressure to adjust the transmission ratio is controlled by a valve device 30 that includes a hydrodynamic torque sensor 31. The arrangement for the control of the pressure is assumed to be known and is therefore not explained in greater detail herein.

The output-side axially-displaceable conical disks 13 and 15 are provided with an arrangement for compensating for centrifugally-generated oil pressure. For that purpose, eight to twelve centrifugal weights 33 are circumferentially distributed between the conical disks 13 and 15. Radial grooves 36 are incorporated in the conical disk 15, in which pins that are provided on the centrifugal weights 33 engage. The radial grooves 36 enable movement of the centrifugal weights 33 in a radial direction. Pins are likewise provided on the other sides of the centrifugal weights 33, which engage with spiral grooves 35 that are formed in a transmission disk 34. Because of the interaction of the centrifugal weights 33 and the spiral grooves 35, movement of the centrifugal weights 33 in a radial direction is transformed into a rotational movement of the transmission disc 34. Furthermore, the inner diameter of the transmission disk 34 is provided with a coarse pitch screw thread 37 that interacts with a complementary thread that is formed on the conical disk 13. The coarse pitch screw thread 37 transforms the rotational movement of the transmission disk 34 to an axial movement of the conical disk 13 relative to the conical disk 15, and the two axially-displaceable conical disks 13 and 15 are drawn together against the centrifugally-generated oil pressure.

A partition 39 of a substantially circular cylindrical barrel form is provided on the conical disk 15, which is axially guided in a complementary axial recess 40 in the conical disk 13. During an axial displacement of the two conical disks 13 and 15 relative to each other the partition 39 is consequently moved into or out of the recess 40. The relatively large cone angle of approximately 17° of the conical disks 13 and 15 produces a relatively long guide surface on the inner conical disks.

The input shaft 1 is rotatably supported by bearings 45 and 46. The output shaft 5 is rotatably supported by a movable bearing 47 and a fixed bearing 48. The conical disk 8 is integrally formed with the input shaft 1. The conical disk 10 is rigidly connected with the input shaft 1 through a press fit and subsequent laser welding.

Figure 2:
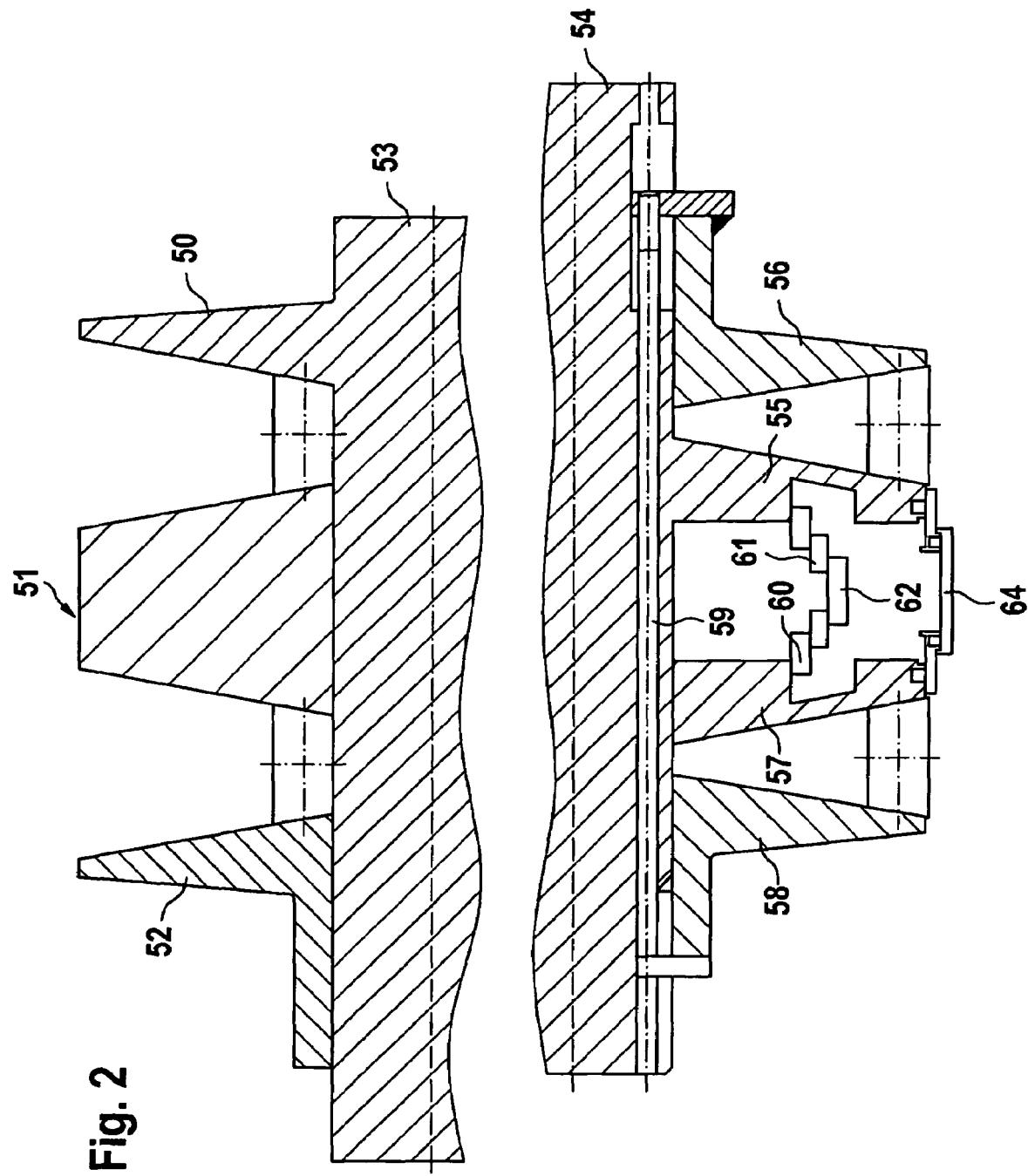
FIG. 2 is a schematic cross-sectional view of a belt-driven conical-pulley transmission with symmetrical conical disks and with a single-sided contact pressure arrangement.

The conical disk pairs on the input side are shown in cross section in the upper half of FIG. 2 and the conical disk pairs on the output-side are shown in cross section in the lower half. An outer, axially-fixed conical disk 50 is located on the input side. In the center two axially-displaceable conical disk surfaces 51 are connected together as one piece. An axially-displaceable conical disk 52 is located on the other outer side. The conical disks 50 to 52 are non-rotatably connected with the input shaft 53.

Half of the output shaft 54 is shown in cross section in the lower half of FIG. 2. An axially-fixed conical disk 55 is non-rotatably connected with the output shaft 54. Additional conical disks 56, 57, and 58 are also non-rotatably but axially-displaceably connected with the output shaft 54. The two axially-displaceable conical disks 56 and 58 are coupled together by an inner threaded rod 59. In addition, the inner conical disks 55 and 57 are coupled together by the threaded bushings 60, 61, and 62. Furthermore, the pressure chamber between the conical disks 55 and 57 is sealed in a radially outward direction by a telescoping cylinder 64.

The belt-driven conical-pulley transmission shown in FIG. 2 has symmetrical cone angles. Thus, the negative effects of an asymmetric arrangement are avoided. The contact pressure takes place on the input side from the left and on the output-side through a centrally-located cylinder between the conical disks 55 and 57.

Figure 4:
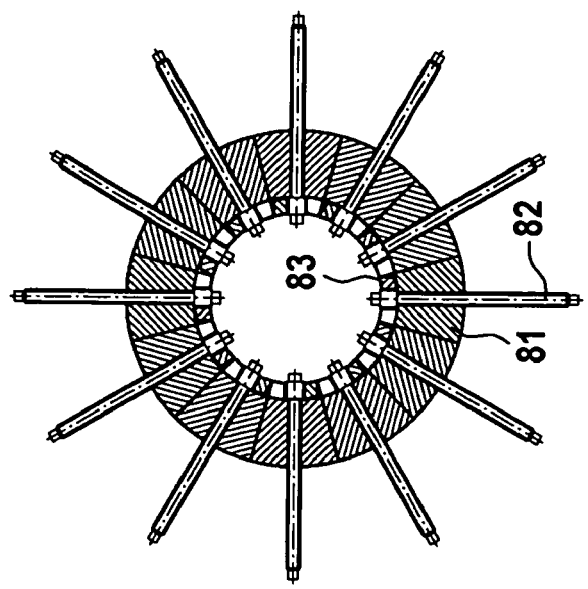
FIG. 4 is a cross-sectional view taken along the line IV-IV of FIG. 3.
Figure 3:
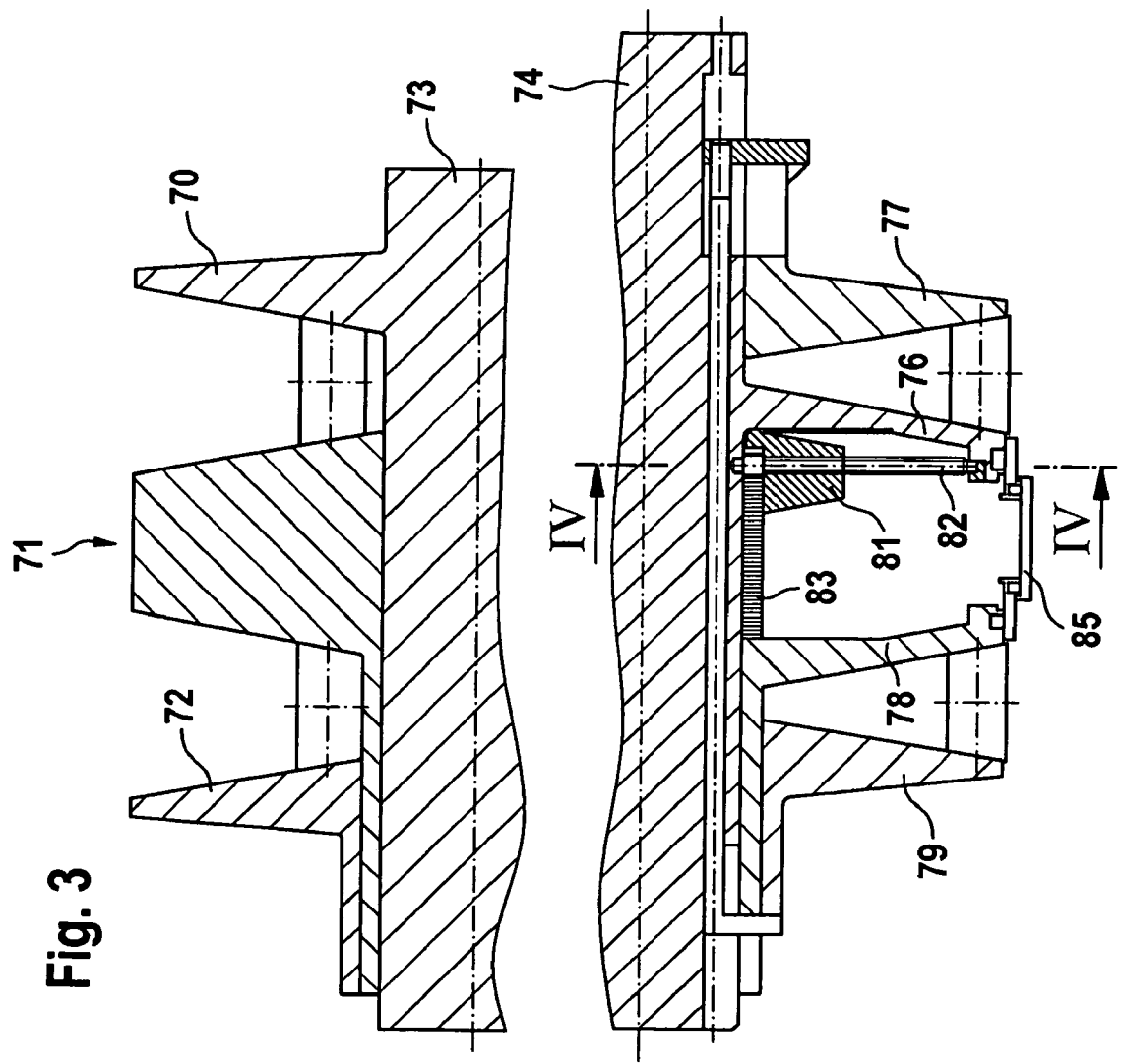
FIG. 3 is a schematic cross-sectional view of a belt-driven conical-pulley transmission with a mechanical compensation for centrifugally-generated oil pressure, and with a coarse pitch screw thread and a toothed rack.

An additional configuration variant of a mechanical compensation for centrifugally-generated oil pressure is shown in FIGS. 3 and 4. An axially-fixed conical disk 70 is combined with two axially-displaceable conical disks 71 and 72 on the input side. Two conical disk surfaces are combined in the conical disk 71. The conical disk 70 is formed in one piece with the input shaft 73. The conical disks 71 and 72 are non-rotatably but axially-displaceably connected with the input shaft 73.

Half of the output shaft 74 is shown schematically in the lower half of FIG. 3. An axially-fixed conical disk 76 is located on the output shaft 74. The conical disk 76 is formed in one piece with the output shaft 74 in the illustrated example. The axially-displaceable conical disks 77, 78, and 79 are non-rotatably but axially-displaceably connected with the output shaft 74.

A centrifugal weight 81 is displaceably located with the help of a radially-arranged threaded spindle 82 on the output side in the inner space between the conical disks 76 and 78. For that purpose, the threaded spindle 82 is rotatably supported by the axially-fixed conical disk 76. The threaded spindle 82 is rotated when the centrifugal weight 81 is moved in the radial direction with reference to the conical disk 76. Radially inwardly, the threaded spindle 82 interacts with a toothed rack 83 that is coupled with the conical disk 78. A rotation of the threaded spindle causes the conical disk 78 to be drawn toward the axially-fixed conical disk 76 by the toothed rack 83.

FIG. 4 shows that twelve centrifugal weights 81 are evenly distributed circumferentially relative to the conical disk 76. The corresponding threaded spindles 82 are arranged in a star-like pattern at equal angular spacings from each other. The corresponding toothed racks 83 run in an axial direction.

Figure 5:
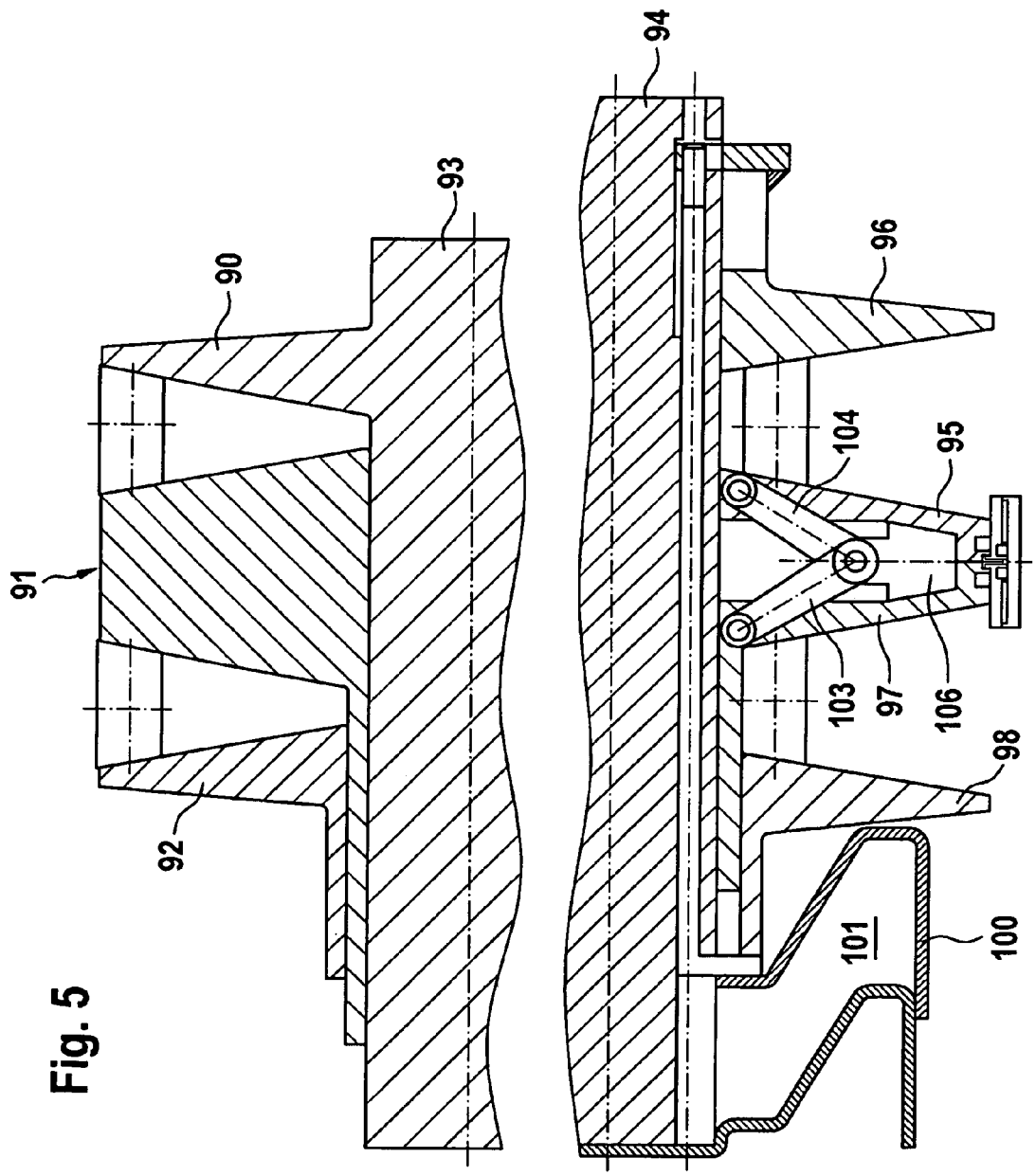
FIG. 5 is a schematic cross-sectional view of a belt-driven conical-pulley transmission with a toggle link mechanism for compensating for centrifugally-generated oil pressure.

Another variant of a mechanical compensation for centrifugally-generated oil pressure is shown schematically in cross section in FIG. 5. An axially-fixed conical disk 90 is combined with an axially-displaceable conical disk 91 and an axially-displaceable conical disk 92. Two conical disks 91 are combined in one piece in the conical disk 91. The conical disk 90 can be integrally formed with the input shaft 93. The conical disks 91 and 92 are non-rotatably but axially-displaceably connected with the input shaft 93.

Half of the output shaft 94 is shown in cross section in the lower half of FIG. 5. An axially-fixed conical disk 95 can be integrally formed with the output shaft 94. The axially-displaceable conical disks 96, 97, and 98 are non-rotatably but axially-displaceably connected with the output shaft 94. As is indicated in FIG. 5, the compensation for centrifugally-generated oil pressure can take place through the actuator 100 that abuts at an arch with the axially-displaceable conical disk 98 and partially includes a pressure chamber 101. If the pressure in the pressure chamber 101 increases, the actuator 100 moves toward the conical disk 95 and carries with it the axially-displaceable conical disk 98.

Instead of through the actuator 100, the compensation for centrifugally-generated oil pressure can also be produced through the toggle mechanism links 103, 104, by which the conical disks 95 and 97 are coupled with each other. For that purpose the toggle links 103 and 104 are linked together. A centrifugal weight 106 is attached at the link joint. When the centrifugal weight 106 moves radially outward the conical disk 97 is shifted toward the axially-fixed conical disk 95.

Figure 6:
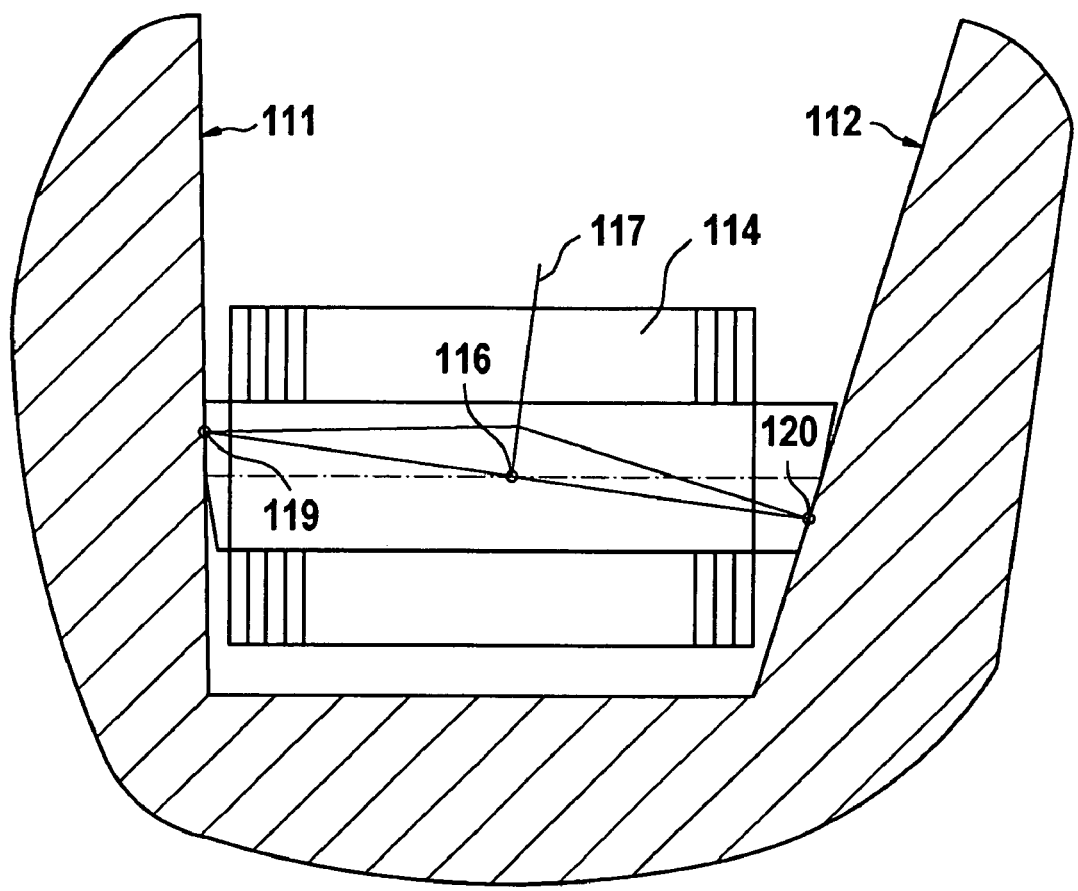
FIG. 6 is a fragmentary cross-sectional view showing the geometry of chain for a belt-driven conical-pulley transmission in accordance with the invention.

A particular geometric arrangement of the rocker pressure members of a chain is shown in FIG. 6 for a belt-driven conical-pulley transmission in accordance with the invention having asymmetrical cone angles. The conical surfaces of the corresponding conical disks are designated as 111 and 112. The chain formed from many individual links is designated as 114. The centroid, also referred to as the pin center, is designated as 116. The angle bisector between the conical disks 111 and 112 is designated as 117. The centers of the contact surfaces are designated as 119 and 120.

The bearing surfaces of the pressure members of chain 114 are shifted from the centerline in such a way that the surface normals created at the centers of the bearing surfaces form a common intersection point with the angle bisector 117 of the cone angles. The same axial force conditions as in a symmetrical embodiment are realized in reference to the centroid 116 of the chain. Thus, a tilting of the chain can be actively counteracted with the appropriate selection of the contact point. Due to the fact that an uneven circumferential force distribution can take place in an asymmetrical embodiment, an additional shift of the contact points toward the outside can lead to additional compensation.

Although particular embodiments of the present invention have been illustrated and described, it would be apparent to those skilled in the art that various changes and modifications can be made without departing from the spirit of the present invention. It is therefore intended to encompass within the appended claims all such changes and modifications that fall within the scope of the present invention.

What is claimed is:

1. A continuously variable transmission having an input side and an output side and comprising: two conical disk pairs on the input side and two conical disk pairs on the output-side; two endless torque-transmitting means disposed in parallel and extending between and connecting together the input side conical disk pairs and the output side conical disk pairs; wherein the conical disk pairs each have asymmetrical conical angles; wherein the two conical disk pairs on the input side and the two conical disk pairs on the output-side each include two outer, axially-fixed conical disks and two axially-displaceable inner conical disks positioned between the outer, axially-fixed conical disks, wherein the inner conical disks have a cone angle of between about 10° and about 30°; including a plurality of centrifugal weights and a transmission disk positioned between the axially-displaceable conical disks, wherein the transmission disk includes spiral grooves for transforming radial movement of the centrifugal weights into rotational movement of the transmission disk, and a thread provided at an inner diameter of the transmission disk for transforming the rotation of the transmission disk into an axial movement of the axially-displaceable conical disks relative to each other.

2. A continuously variable transmission in accordance with claim 1, wherein the outer, axially-fixed conical disks have an inwardly-facing conical surface having a cone angle that is less than about 1°.

3. A continuously variable transmission in accordance with claim 1, including two actuators positioned between the axially-displaceable conical disks.

4. A continuously variable transmission in accordance with claim 3, wherein the actuators are piston/cylinder units.

5. A continuously variable transmission in accordance with claim 1, wherein the two axially-displaceable conical disks are guided for axial movement relative to each other.

6. A continuously variable transmission in accordance with claim 1, wherein the two axially-displaceable conical disks are non-rotatably connected with each other via a positive connection.

7. A continuously variable transmission in accordance with claim 1, wherein the inner conical disks have a cone angle of between about 15° and about 20°.

8. A continuously variable transmission in accordance with claim 1, including two axially-displaceable inner conical disks positioned between the outer, axially-fixed conical disks, wherein the inner conical disks have a cone angle of about 17°.

9. A continuously variable transmission in having an input side and an output side and comprising: two conical disk pairs on the input side and two conical disk pairs on the output-side; two endless torque-transmitting means disposed in parallel and extending between and connecting together the input side conical disk pairs and the output side conical disk pairs; wherein the conical disk pairs each have asymmetrical conical angles; wherein the two conical disk pairs on the input side and the two conical disk pairs on the output-side each include two outer, axially-fixed conical disks and two axially-displaceable inner conical disks positioned between the outer, axially-fixed conical disks, wherein the inner conical disks have a cone angle of between about 10° and about 30°: wherein the two axially-displaceable conical disks are non-rotatably connected with each other via a positive connection and the positive connection is formed by interengaging teeth.

10. A continuously variable transmission in accordance with claim 9, wherein the outer, axially-fixed conical disks have an inwardly-facing conical surface having a cone angle that is less than about 1°.

11. A continuously variable transmission in accordance with claim 9, including two actuators positioned between the axially-displaceable conical disks.

12. A continuously variable transmission in accordance with claim 9, wherein the two axially-displaceable conical disks are guided for axial movement relative to each other.

13. A continuously variable transmission in accordance with claim 9, wherein the inner conical disks have a cone angle of between about 15° and about 20°.

* * * * *